3,444,106
FOAMED VULCANIZED SOLID POLYMERS
Fay W. Bailey, Bartlesville, Okla., assignor to Phillips Petroleum Company, a corporation of Delaware
No Drawing. Filed Feb. 21, 1966, Ser. No. 528,771
Int. Cl. C08f 47/08
U.S. Cl. 260—2.5        7 Claims

ABSTRACT OF THE DISCLOSURE

A foamed solid polymer of a 1-olefin and a diolefin is formed by heating with steam, sulfur and zinc oxide under pressure and suddenly releasing the pressure.

---

This invention relates to foamed polymers which are vulcanized before the foaming step. In one aspect this invention relates to a method for forming foamed articles from vulcanizable solid polymers. In another aspect this invention relates to foamed solids made from vulcanizable polymers.

It is well known that cellular plastics display better thermal, accoustical, and electrical insulation properties than do the dense solid plastics. They also possess improved dielectric properties, superior mechanical dumping characteristics, and a higher degree of flexibility. The lower density of the cellular material also contributes to considerable savings in raw material costs in applications utilizing these properties.

I have found that vulcanizable ethylene polymers, for example ethylene polymers containing a conjugated diolefin, can be foamed by sudden release of pressure after being heated to a temperature of about 300 to 500° F., in the presence of steam, provided that both sulfur and zinc oxide are present in the compounding recipe. The foaming step can be accomplished by sudden release of pressure at the end of the curing period provided the cure is effected in a steam autoclave in the above temperature range, or the cured polymer can be heated to within the above temperature range in a steam autoclave, and then foamed by sudden release of the steam pressure.

It is an object of this invention to provide a simple method for producing foamed articles from a vulcanizable solid polymer. It is also an object of this invention to provide a foamed solid polymer produced without the addition of a conventional foaming agent. Still another object of this invention is to provide a method for producing a foamed article from an ethylene polymer containing a diolefin without the necessity of adding a conventional foaming agent. Other objects an advantages will be apparent to one skilled in the art upon studying this disclosure including the detailed description of the invention.

The polymers applicable for use in this invention include copolymers of ethylene and a diolefin and terpolymers of ethylene, a diolefin and another 1-olefin. These polymers can be made by the process of U.S. Patent 2,825,721, issued Mar. 4, 1958, to J. Hogan et al., utilizing a chromium oxide catalyst. The process of preparing the polymer is not a part of my invention, however, and it is within the scope of the invention to use polymers made with other catalysts, for example the well-known organometal catalyst systems.

The 1-olefins which can be utilized with ethylene in the terpolymers are those disclosed in the above-identified patent to Hogan et al. and include 1-butene, propylene, 1-pentene, 1-hexene, and the like.

The diolefins which are applicable are the conjugated dienes and include 1,3-butadiene, isoprene, 1,3-pentadiene, cyclopentadiene, 1,3-hexadiene, and the like.

I have found that both sulfur and zinc oxide must be present in the compounding recipe in order for the foaming reaction to occur. The amounts of sulfur and zinc oxide utilized are those generally utilized in vulcanization recipes, for example, sulfur can be used in amounts of about 0.25 to 5 parts by weight per 100 parts by weight of polymer, and the zinc oxide will normally be utilized in amounts of about 1 to 25 parts by weight per 100 parts by weight of polymer. Vulcanization accelerators will normally be used in order to speed up the vulcanization time and conventional accelerators can be used in conventional amounts, for example, 0.1 to 3 parts by weight per 100 parts by weight of polymer.

The vulcanization or curing and the foaming can be carried out substantially simultaneously, that is, by suddenly releasing the steam pressure exerted by the autoclave at the end of the vulcanization period, provided the vulcanization is carried out at a temperature in the range of 300 to 500° F. If the vulcanization is carried out at a temperature below 300° F., the temperature can be raised at the end of the curing period for about 15 seconds to 15 minutes and the foaming will be accomplished by sudden release of steam pressure at the end of that time. Alternatively, the cured polymer can be heated at a temperature of about 300 to 500° F. for a period of 15 seconds to 15 minutes while confined at a steam pressure in the range of about 50 to 700 p.s.i. and then the pressure suddenly released to produce the foamed plastic material. Curing or vulcanization will usually be carried out within about 3 to 75 minutes.

Sheets of cured polymer or polymer in other shapes can be heated in an autoclave by introduction of steam into the autoclave so that the material is heated to a temperature in the range of about 300 to 500° F. at a pressure of about 50 to 700 p.s.i. and maintained for a period of about 15 seconds to 15 minutes, after which the pressure on the autoclave is suddenly released and the foamed materials recovered therefrom. Sheets of foamed vulcanized polymer so produced have the appearance and feel of leather.

The invention is further illustrated by reference to the data in the following table wherein a number of runs show how the foamed plastic of the invention can be obtained. The polymer employed in the table was obtained by the copolymerization of ethylene and 1,3-butadiene made with 2.5 weight percent butadiene in the monomer feed. The monomer was contacted with a chromium oxide-microspheroidal silica catalyst containing 1.2 weight percent chromium trioxide that was activated in dry air for 5 hours at 1300° F. The polymerization was conducted at a temperature in the range of 270 to 300° F. and a pressure of 450 p.s.i.

TABLE.—FOAMED ETHYLENE-BUTADIENE POLYMER

| Run No | 1 | 2 | 3 | 4 | 5 | 6 | 7 | 8 | 9 | 10 | 11 | 12 |
|---|---|---|---|---|---|---|---|---|---|---|---|---|
| Parts by Weight: | | | | | | | | | | | | |
| Polymer | 100 | 100 | 100 | 100 | 100 | 100 | 100 | 100 | 100 | 100 | [1] 100 | [1] 100 |
| Zinc Oxide | 5 | 5 | 5 | 0 | 5 | 5 | 5 | 5 | 0 | 5 | 0 | 5 |
| Stearic Acid | 1 | 1 | 1 | 1 | 0 | 1 | 1 | 1 | 0 | 1 | 0 | 1 |
| Sulfur | 1 | 1 | 1 | 1 | 1 | 0 | 1 | 1 | 0 | 1 | 0 | 1 |
| Accelerator A [2] | 0.5 | 0.5 | 0.5 | 0.5 | 0.5 | 0.5 | 0 | 0.5 | 0 | 0.5 | 0 | 0.5 |
| Accelerator B [3] | 1.5 | 0 | 0 | 1.5 | 1.5 | 1.5 | 1.5 | 0 | 0 | 1.5 | 0 | 1.5 |
| Accelerator C [4] | 0 | 1.5 | 0 | 0 | 0 | 0 | 0 | 0 | 0 | 0 | 0 | 0 |
| Accelerator D [5] | 0 | 0 | 1.5 | 0 | 0 | 0 | 0 | 0 | 0 | 0 | 0 | 0 |
| Foamed Product [6] | Yes | Yes | Yes | No | Yes | No | Yes | Yes | No | Yes | No | No |

[1] An ethylene-butene-1 copolymer made by the process of U.S. 2,825,721 and treated as in Runs 1–9.
[2] 2,2'-dibenzothiazyl disulfide.
[3] N-oxydiethylene-2-benzothiazyl sulfenamide.
[4] N,N-diisopropylbenzothiazole-2-sulfenamide.
[5] Tetramethylthiuram monosulfide.
[6] The products of Runs 1–9 were cured and foamed by being heated for 5 minutes at 390° F. in a steam autoclave, followed by sudden pressure release. The product of Run 10 was first cured 30 minutes at 350° F. in a press, and was then treated in the same manner as the other products.

The data in the above table show that the accelerators can be eliminated from the compounding recipe and still obtain foaming, but that sulfur and zinc oxide are both essential in order to obtain a foamed product. Run 9 shows that the polymer alone will not foam and Runs 11 and 12 show that a diolefin is necessary in the formulation to obtain foaming, thus indicating that crosslinking is essential in order to obtain the foamed product according to the invention.

Polymers which were vulcanized under pressure in a mold did not foam when the molding pressure was released at the end of the curing period without allowing the mold or the polymer to cool.

The above data show that the presence of steam at the disclosed temperature range is necessary in order to obtain the foamed articles of the invention.

That which is claimed is:

1. The method of producing a foamed solid copolymer of a 1-olefin and a diolefin which comprises heating an admixture of said polymer, steam, and curing amounts of curing agents comprising sulfur and zinc oxide to a temperature of about 300 to 500° F. at a pressure in the range of about 50 to 700 p.s.i. for a time in the range of about 15 seconds to 75 minutes; and suddenly releasing the steam pressure.

2. The process of claim 1 wherein the sulfur is present in the amount of 0.25 to 5 parts by weight and the zinc oxide is present in the amount of 1 to 25 parts by weight per 100 parts by weight of the polymer.

3. The process of claim 2 wherein the polymer is cured prior to foaming and the heating time is about 15 seconds to 15 minutes.

4. The process of claim 2 wherein the curing and foaming steps are carried out together and the heating time is about 3 minutes to 75 minutes.

5. The process of claim 2 wherein the polymer is a copolymer of ethylene and 1,3-butadiene.

6. The process of claim 2 wherein the polymer is a terpolymer of ethylene, 1-butene and 1,3-butadiene.

7. The process of claim 2 wherein the polymer is a terpolymer of ethylene, propylene and 1,3-butadiene.

References Cited

UNITED STATES PATENTS 3,317,496   5/1967   Natta et al. _____ 260—79.5
3,324,061   6/1967   Tanquary et al. _____ 260—29.2

MURRAY TILLMAN, *Primary Examiner.*

M. FOELAK, *Assistant Examiner.*

U.S. Cl. X.R.

260—79.5